Nov. 4, 1930.                M. D. TUCKER                1,780,282

SHIPPING OF AUTOMOBILES

Filed Jan. 5, 1929

INVENTOR
MAX D. TUCKER
BY
Barnes, Dickey & Pierce
ATTORNEYS

Patented Nov. 4, 1930

1,780,282

UNITED STATES PATENT OFFICE

MAX D. TUCKER, OF DETROIT, MICHIGAN, ASSIGNOR TO THE EVANS AUTO LOADING CO. INC., A CORPORATION OF DELAWARE

SHIPPING OF AUTOMOBILES

Application filed January 5, 1929. Serial No. 330,439.

This invention relates to the shipping of automobiles in railroad box cars and the like, and has for its principal object the provision of new and novel means for securing the supporting members for the automobile to the floor of the freight car by new and novel means.

Another object is to provide means whereby the supporting members employed for supporting automobiles for shipment in freight cars may be easily and quickly secured to the floor of such freight cars.

A further object is to provide, in combination with the members adapted to support and anchor an automobile for shipment in a freight car, slotted channels formed in the floor of the freight car and brackets formed on the supporting members, together with bolts having their heads slidably confined in the channels and cooperable with the brackets whereby the supporting members may be quickly and adjustably secured against movement to the floor of the freight car.

The above being among the objects of the present invention, the same consists in certain features of construction and combinations of parts to be hereinafter described with reference to the accompanying drawings, and then claimed, having the above and other objects in view.

In the accompanying drawing which shows a suitable embodiment of the present invention, and in which like numerals refer to like parts throughout the several different views.

In shipping completely assembled automobiles, or substantially completely assembled automobiles in freight cars, a number of different devices are conventionally employed, depending upon the position of the automobile in the freight car. Where the automobile rests directly on the floor the conventional method is to provide chocks for the wheels, which chocks are shaped to fit the tires and are secured to the floor by nails or drive screws driven through the chock and into the floor.

Some automobiles are positioned for shipment in the freight cars with their rear wheels on the floor and provided with suitable chocks as above described, and with the front wheels raised off the floor as far as practical and supported in such position by what is commonly known as a "deck". In other cases, two automobiles are secured, one above the other, in the freight car, the one resting directly on the floor and the other being supported at both ends above it by means of decks as above described.

Figure 1:
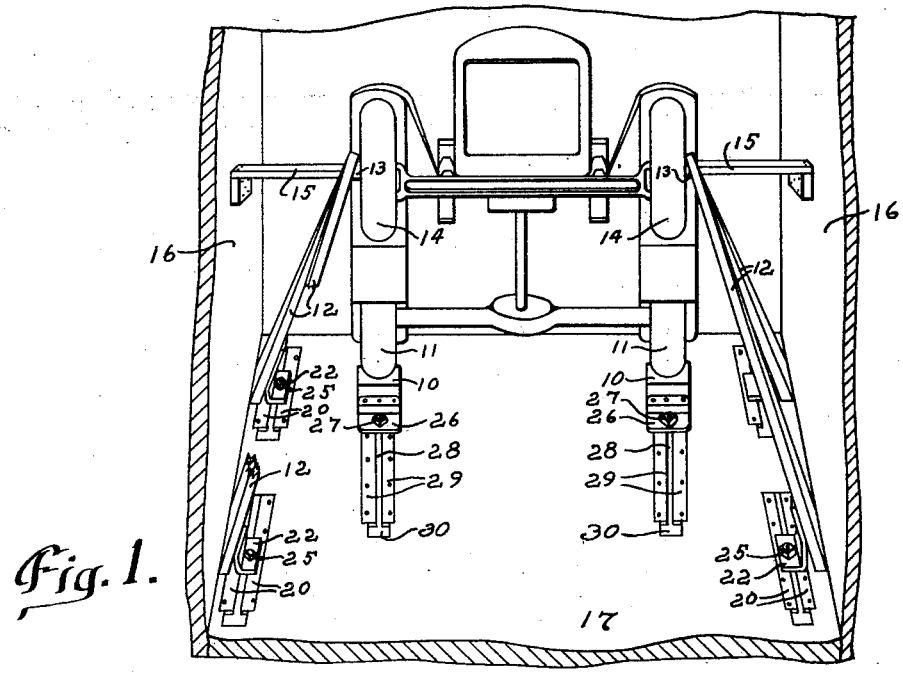
Fig. 1 is a more or less diagrammatic fragmentary perspective view showing an automobile supported and secured for shipment in a freight car.
Figure 2:
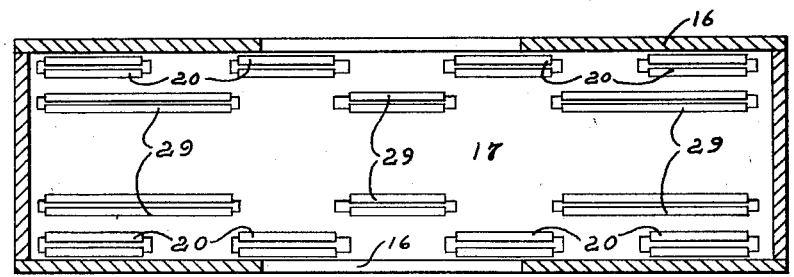
Fig. 2 is a horizontal sectional view taken through a freight car showing the floor thereof equipped with slotted channels in accordance with the practice of the present invention.
Figure 3:
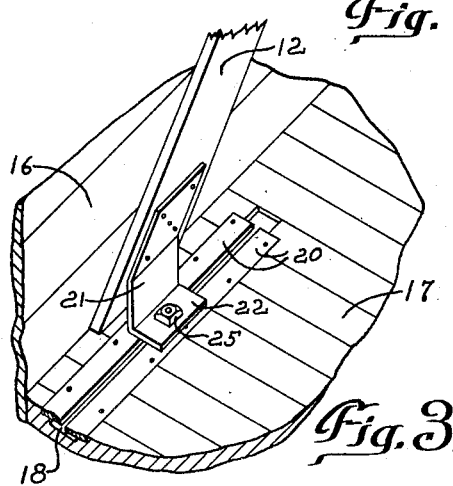
Fig. 3 is a fragmentary perspective view showing a leg of one of the supporting members secured in place to the floor of the freight car.

For the purpose of illustration, I have shown in the accompanying drawing in Fig. 1 an automobile secured for shipment in a freight car by means of the second method, that is, providing chocks such as 10 for cooperating with the rear wheels 11 and decks comprising a pair of wooden legs 12 arranged in inverted V formation for supporting the front end of the automobile. The upper end of the legs 12 converge and cooperate with the hubs 13 of the front wheels 14 and are prevented from lateral movement by means of the braces 15 extending between the hubs 13 and the adjacent side 16 of the freight car.

As previously described, the chocks 10 in conventional constructions are secured to the floor 17 of the freight car by means of nails or screws. Inasmuch as only certain types of freight cars are generally suitable for use in the shipment of automobiles in the manner described, such freight cars are used over and over for such purpose, and inasmuch as it is of course necessary when the car reaches its destination to remove the decks and the chocks to remove the automobiles, the nails and drive screws must be removed from the floor. The result is that the floor soon becomes badly cracked and damaged at the points where the nails and drive screws are employed, so that after a few shipments it is necessary to repair the floor in order to provide the proper securement for the decks and chocks. This item of repairing the freight cars, as well as the danger of damage to the automobiles being shipped if the floors are not repaired in time, runs into a material amount of money annually, and the present invention is designed to eliminate this damage to the floors of the freight cars, and further to provide an easy and quick means for securing the chocks and decks in position.

Figure 4:
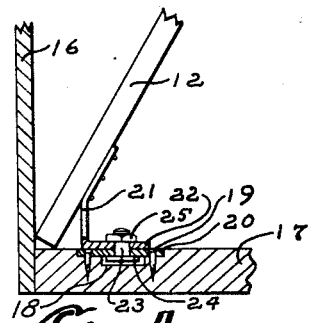
Fig. 4 is a vertical sectional view taken centrally through the construction shown in Fig. 3 and illustrating the manner in which the bolt secures the bracket to the floor.

In accordance with the present invention, a series of aligned grooves such as 18 are provided in the floor 17 of the freight car adjacent each side 16 thereof, and extending from one end of the freight car to the other. Over each groove 18 is secured by screws such as 19 or other suitable means, a pair of metal plates 20 which are positioned in adjacent but spaced relationship so as to overlap the sides of the grooves, and which preferably stop short of the ends of the grooves at both ends of the latter. The plates 20 are preferably set in flush with the floor 17 as indicated in the drawings. The lower ends of the deck legs 12 are provided with metal brackets 21 suitably secured thereto, each bracket 21 being provided with an inwardly extending flange portion 22. A bolt 23 having an enlarged or T head 24 is positioned with the head 24 in the groove 18 and with the bolt projecting upwardly between the plates 20 and through the flange 22 of the bracket 21. A nut 25 is threaded on the bolt 23 and acts to securely clamp the bracket 21 and therefore the corresponding deck leg 12 against movement relative to the floor 17. As will be seen most clearly in Fig. 4 of the drawings, the bracket 21 is offset or bent outwardly from its point of attachment to the member 12 so as to position the lower end of the deck legs 12 against the side wall 16 of the freight car, thereby relieving the bracket from strain of the weight placed upon the leg. The grooves 18 for the deck legs 12 are preferably positioned as close to the sides 16 of the freight car as is practical in order to obtain the greatest lateral stability possible in the construction.

The chocks 10 are also provided with brackets 26 secured thereto, which in turn are secured to the floor 17 by bolts 27 received in slots 28 between plates 29 overlying grooves 30 formed in the floor 17, in line with the wheels 11 as indicated in the figures. The plates 20 and 29 are of course a permanent part of the floor 17 and the brackets 21 and 26 are of course a permanent part of the deck legs 12 and chocks 10 respectively.

In employing the present invention, the automobile is run into the freight car, jacked up to a slightly higher position than it will assume in shipment, the chocks 19 are placed under the wheels, the bolts 27 are inserted in the slots 28 with the heads thereof received in the grooves 30, and are moved along the grooves 28 until the openings for them in the brackets 26 are in a position to receive them, after which the brackets are positioned over the bolts, and their nuts are drawn down to secure the chocks against movement to the floor. The rear wheels 11 are then moved down into contact with their respective chocks, and anchoring means not shown may be provided for preventing the rear wheels 11 from bouncing out of contact with the chocks 10. The decks for the front end of the automobile may be placed in position in a similar manner, and the brackets 21 at the lower end of the legs 12 be secured to the floor in a similar manner by simply inserting the various bolts 28 and tightening their respective nuts 25.

The removal of the automobile simply necessitates a reversal of these operations.

It will be obvious that with this construction there is no need of repeatedly driving and removing nails and drive screws in the floor of the freight car, and consequently no damage to the floor from this cause ever arises.

It will also be apparent that with this construction the freight car is not limited to any particular length or size of automobile because the grooves 18 and 30 with their cooperating plates 20 and 29 are preferably made of such length as to take care of the position necessary for the decks and chocks for any size of automobile, and it will be apparent that such grooves and plates may be formed continuously from one end of the freight car to the other, instead of in separate lengths as shown, if a greater range of adjustability of the chocks and decks lenthwise of the car is thought necessary or desirable.

It will also be apparent that where the first described method of shipment is employed, that is, where chocks such as 10 are employed for both the front and rear wheels, the outer set of grooves and plates may be dispensed with, and that where the automobiles are double decked the decks for both the front and rear of the automobiles may be secured in place in identically the same manner as that described in connection with the construction shown.

It will further be apparent that although I have shown the brackets 21 as being secured to the inner face of the legs 12, that they may be secured to the end faces of the legs in much the same manner as the brackets 26 are secured to the end faces of the chocks 10, or to other surfaces, without materially affecting the invention involved.

These and other formal changes may be made in the specific embodiment of the invention described without departing from the spirit or substance of the broad invention, the scope of which is commensurate with the appended claims.

What I claim is:

1. In a freight car, in combination with the floor thereof, channels in said floor adjacent the sides thereof and extending lengthwise of said car, bolts having heads confined in said channels slidable in said channels, automobile shipping deck members provided with brackets at their lower ends, said brackets adapted to receive said bolts, and nuts cooperating with said bolts for locking said brackets against movement relative to said floor.

2. In a freight car, means for supporting an automobile for shipment therein comprising, in combination, decks for supporting at least one end of said automobile above the floor of said car, the lower ends of said decks adapted to rest on said floor and being provided with brackets, longitudinally extending channels in said floor, bolts slidably confined in said channels, said bolts projecting through said brackets, and nuts cooperating with said bolts for locking said brackets against movement relative to said floor in any one of a plurality of adjustable positions.

3. In a freight car, in combination with the floor thereof, channels in said floor in spaced relation to the side walls thereof, fastening means slidably retained in said channels, automobile shipping deck members provided with brackets at their lower ends, connected to said fastening means, said brackets being offset to position the lower ends of said deck members against the respective adjacent side walls of the freight car.

4. In a freight car, in combination with the floor thereof, channels in said floor in spaced parallel relation to the side walls thereof, fastening means slidably retained in said channels, automobile shipping deck members provided with brackets at their lower ends detachably connected to said fastening means, said brackets being offset to position the lower ends of said deck members against the respective adjacent side walls of the freight car.

MAX D. TUCKER.